United States Patent Office.

FILLMORE M. SMITH, OF SYRACUSE, NEW YORK.

Letters Patent No. 108,198, dated October 11, 1870.

IMPROVEMENT IN PURIFYING BRINE FOR THE MANUFACTURE OF SALT.

The Schedule referred to in these Letters Patent and making part of the same

Be it known that I, FILLMORE M. SMITH, of Syracuse, in the county of Onondaga and State of New York, have invented a new and improved Process or Method of Purifying Brine for the Manufacture of Pure Common Salt, of which the following is a specification.

The nature of my invention is that of a chemical process, and its object is to purify brine, used in and for the manufacture of common salt, of all the deleterious compounds usually contained therein, thus enabling a pure article of salt to be manufactured from brine which has been deprived of all its injurious constituents.

It may be here stated that the following are deleterious substances usually held in solution with the salt, in varying proportions in brines used for the manufacture of salt, and which are commonly denominated "impurities:"

First, sulphate of lime.
Second, chloride of calcium.
Third, chloride of magnesium.
Fourth, bi-carbonate of iron.

These impurities of the brine exert their injurious effects chiefly in two ways:

They increase the cost of manufacture and injure the quality of the salt produced. The sulphate of lime operates principally in the former manner, and the other impurities in the latter.

The sulphate of lime, in boiling the brine, is largely precipitated when contained in considerable quantity, especially as the brine approaches the point of saturation, and by its ready adhesiveness to a heated surface under brine, and its high non-conducting properties for heat, soon forms a hard, compact non-conducting scale over the heating-surface, thereby greatly retarding evaporation, and occasioning a great loss of heat, as well as rapid corrosion of the heating medium exposed to fire.

The chlorides of calcium and magnesium, whose solution adheres mechanically to the crystals of salt removed from the brine, by their deliquescent properties, keep the salt damp, and, by their acrid and penetrating properties, impair the value of the salt for domestic use and antiseptic purposes.

The bi-carbonate of iron, by decomposition, imparts a reddish or brownish stain to the salt, thereby impairing its marketable qualities.

Any and all of these impurities also, of course, impair the value of the salt by adulteration.

To transform all of these impurities into insoluble substances, and separate them from the brine in a simple and expeditious manner is the chief object of this invention.

This object is effected by superheating, under pressure, in suitable closed vessels, the brine, in which are incorporated the proper proportions of certain chemical substances, to be hereafter described, to a temperature of about 300° Fahrenheit, more or less.

This superheating of the brine promotes and facilitates certain chemical reactions desired, and transforms all of the impurities into insoluble substances, thus wholly precipitating and separating these impurities from the brine.

The precipitated impurities are allowed to settle, and the brine, thus rendered clear and pure, is drawn off, fitted for the manufacture of a pure article of salt therefrom.

This process of removing impurities, of my invention, herein described, has reference solely to the treatment of the brine before the salt is manufactured therefrom, and is not intended to apply to the treatment of the salt after the same is crystalized from the brine.

The chemical substances which I introduce into the brine in connection with the superheating process, for the purpose of decomposing and precipitating the impurities, are the following, in proportions which vary according to the quantity and character of the impurities contained in the brine:

First, sulphate of soda.
Second, common quicklime, (caustic lime.)

The formula of this composition may be varied, while its essential properties and effects remain the same, by adding or substituting a portion of any equivalent salt of soda or of carbonate of lime.

The quantity and character of the impurities of the brine having been carefully determined by means of chemical analysis, the following proportions of chemicals should be used:

First, one chemical equivalent of sulphate of soda for every chemical equivalent of the chlorides of calcium and magnesium contained in the brine.

Second, one chemical equivalent of caustic lime for every chemical equivalent of magnesian salt or salts contained in the brine. An additional portion of caustic lime may or may not be used, as preferred, sufficient to combine with and neutralize the quantity of carbonic acid contained in the brine, either in a free or combined state.

The compounds or precipitates which are produced by the use of the chemicals as above specified are the following:

First, chloride of sodium, which remains in solution.

Second, sulphate of lime, which becomes wholly insoluble and is precipitated.

Third, carbonate of magnesia, or magnesian hydrate, or both, which are precipitated.

Fourth, carbonate of iron, or oxide of iron, or both, which are precipitated.

When some other salt of soda is employed instead of or in addition to the sulphate, the character of the precipitates formed will vary accordingly.

In practice it is not essential, although it is desirable, to adhere closely to the employment of the chemicals in the proportions as above indicated.

A slight departure, however, from these proportions either in excess or deficiency, will result in the production of a better quality of salt than the use of no chemicals at all.

The chemical substances specified may be added to the brine either separately or together, either before or during the heating operation.

When the brine to be purified contains comparatively but a small proportion of magnesian salts, or none, the sulphate of soda alone may be used in the proportions specified.

What I claim as my invention, and desire to secure by Letters Patent, is—

The process of superheating brine, under pressure, in closed vessels, in connection with the use of the chemical substances specified, or their equivalents, substantially as and for the purposes described and set forth.

FILMORE M. SMITH.

Witnesses:
V. W. SMITH,
J. W. LAWTON.